United States Patent [19]

Harbeke

[11] Patent Number: 4,858,958
[45] Date of Patent: Aug. 22, 1989

[54] SLIP-JOINT COUPLING

[76] Inventor: Gerold J. Harbeke, 2807 S. Military Trail, West Palm Beach, Fla. 33415

[21] Appl. No.: 168,020

[22] Filed: Mar. 14, 1988

[51] Int. Cl.$^4$ .............................................. A16L 21/00
[52] U.S. Cl. ..................................... 285/31; 285/423; 285/915
[58] Field of Search .................... 285/31, 32, 915, 423

[56] References Cited

U.S. PATENT DOCUMENTS

| 980,245 | 1/1911 | Goodall | 285/32 |
|---|---|---|---|
| 2,785,910 | 3/1957 | Munger | 285/915 |
| 3,598,430 | 8/1971 | Maher et al. | 285/24 |
| 3,826,521 | 7/1974 | Wilhemsen | 285/15 |
| 4,035,002 | 7/1977 | Curtin | 285/31 |
| 4,072,328 | 2/1978 | Elliott | 285/169 |
| 4,690,434 | 9/1987 | Schmidt | 285/31 |

FOREIGN PATENT DOCUMENTS 3230354  2/1984  Fed. Rep. of Germany ...... 285/915

Primary Examiner—Dave W. Arola
Attorney, Agent, or Firm—Griffin, Branigan & Butler

[57] ABSTRACT

A slip-joint coupling (10) comprises a first coupling piece (12) having a first pipe-mounting portion (16) at one end and a first coupling mating portion (18) at the other end and a second coupling piece (14) having a second pipe-mounting portion (20) at one end and a second coupling mating portion (22) at the other end. The first and second pipe-mounting portions each has a coupling inner diameter as an inner diameter for snugly fitting on outer surfaces of standard plumbing pipes and a coupling outer diameter as an outer diameter. One of the first and second coupling mating portions has the coupling inner diameter as an inner diameter and has an intermediate diameter as an outer diameter. The intermediate diameter is intermediate the coupling inner and outer diameters. The other of said first and second coupling mating portions has the intermediate diameter as an inner diameter and the coupling diameter as an outer diameter. One of these coupling pieces has an internal shoulder between the pipe-mounting portion and the coupling mating portion. The mating portions are of equal length.

6 Claims, 1 Drawing Sheet

SLIP-JOINT COUPLING

BACKGROUND OF THE INVENTION

This invention relates broadly to the art of pipe couplings and more specifically to slip-joint pipe couplings that are used for joining plastic pipes abutting one another end-to-end.

Joining the ends of abutting pipes is a common practice in plumbing and there are, of course, numerous couplings used for this purpose. One of the more basic such couplings comprises a cylinder that is slightly larger than the pipe having opposite open ends for receiving the ends of the pipes. The internal surface of the coupling is adhered to the external surfaces of the pipes by an adhesive Normally, such a coupling has an internal annular shoulder approximately in the center thereof to abut against ends of the pipes and thereby ensure that the coupling is properly positioned on, that is centered on, the ends of the pipes, with enough wall extending over both pipes to ensure a proper joint. Such a coupling is shown in U.S. Pat. No. 3,826,521 to Wilhemsen. However, couplings with internal shoulders are not always usable because it is not always possible to bring two pipes together by moving them longitudinally toward each other. For example, where a section of pipe is to be used for joining the ends of two fixed pipes together, the ends of the section cannot be inserted longitudinally into the ends of two such couplings mounted on the two fixed pipes. For this reason, couplings without internal shoulders, also shown in U.S. Pat. No. 3,826,521 to Wilhelmsen, are sometimes used. When this is done the couplings are slid completely onto either the pipe section or the fixed pipes, the section is then placed between the two fixed pipes, adhesive is placed on the ends of the section and the fixed pipes, and the couplings are slid into position over the abutting ends of the pipe section and fixed pipes where the couplings are held until the adhesive cures. A difficulty with this procedure is that personnel performing it do not always draw lines on the pipes or the pipe section indicating where the couplings should be located in order to be centered on abutting ends. Thus, after the adhesive is in place and a worker moves the coupling joints over the abutting ends, he "loses track" of where the abutting ends are positioned and therefore sometimes holds the coupling joint off center, leading to an improper coupling of the section and pipes. It is an object of this invention to provide a slip coupling joint which allows a pipe to be moved laterally to an abutting position with another pipe and thereafter controls the movement of a slip-joint coupling to be slid into a centered position on the abutting pipe ends.

There have been some slip-joint couplings suggested which insure that coupling joints are centered on abutting ends, an example thereof being in U.S. Pat. No. 4,690,434 to Schmidt. Although these devices offer some advantages, they are laterally bulky, that is, requiring an undue amount of space laterally of the pipes. Most such devices include joining bells, or wide mouths, for receiving other coupling joint members which take up undue amounts of space in walls in which they are located. Sometimes such coupling elements actually require that walls be built larger than is necessary for the support of a building. A difficulty with such couplings is that they are not normally streamlined in form, most having stepped outer diameters which makes them somewhat clumsy to use and position among wall framing. Thus, it is an object of this invention to provide a slip-joint coupling which does not take up an undue amount of lateral space, and which is streamlined in form, having only one external diameter when in its final, assembled, configuration.

Further, it is an object of this invention to provide a slip-joint coupling which, when installed, not only has a composite single external diameter but a single internal diameter as well, with the exception of an internal shoulder for contacting the end of one of pipes to be joined.

SUMMARY

According to principles of this invention, each piece of a two-piece slip-joint coupling has a pipe-mounting portion with a coupling inner diameter for snugly fitting an outer surface of a standard plumbing pipe and a coupling outer diameter. One of the first and second pieces has a coupling mating portion with the coupling inner diameter as its inner diameter and an intermediate diameter as its outer diameter, the intermediate diameter having a size between the coupling inner diameter and the coupling outer diameter. The other of the first and second pieces having a coupling mating portion with approximately the intermediate diameter as an inner diameter and approximately the coupling outer diameter as an outer diameter. Thus, the pipe-mounting portion of the first piece can be mounted on an end of a first pipe, the pipe-mounting portion of the second piece can be mounted on an end of a second pipe and one of the first and second pieces can be slid toward the other so that the coupling mating portions can be telescope together to form a composite coupling having fixed inner and outer diameters. One of the pieces has a shoulder between the pipe mounting portion and the coupling mating portion to abut the end of the pipe on which this piece is mounted.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
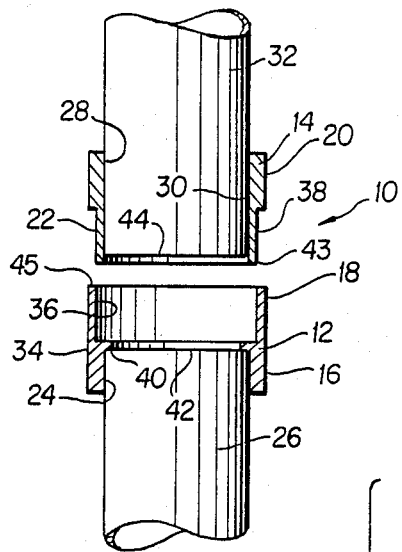
FIG. 1 is a side, partially sectional, view of two pipes having coupling pieces of a two-piece slip-joint coupling of this invention mounted thereon, prior to the coupling pieces being telescoped together.

A two-piece slip-joint coupling 10 of this invention comprises a first coupling piece 12 and a second coupling piece 14. The first coupling piece 12 includes a first pipe mounting portion 16 at one end and a first coupling mating portion 18 at the other end while the second coupling piece 14 includes a second pipe-mounting portion 20 at one end and a second coupling mating portion 22 at the other end. The first and second pipe-mounting portions 16 and 20 have identical wall thicknesses, which is the wall thickness of a standard coupling joint, which is, in turn, approximately the same thickness as a pipe it is used to couple. For example, for a 3 inch inner diameter (ID), schedule 40, pipe the wall thickness of the first and second pipe-mounting portion 16 and 20 are approximately ¼ inch, which is approximately the same thickness as a 3 inch, schedule 40, pipe. The thicknesses of the first and second coupling mating portions 18 and 22 on the other hand, are approximately ⅛ inch The inner diameter of the first pipe-mounting portion 16, that is the diameter of its internal surface 24, is referred to as the coupling inner diameter and is approximately the same as the external diameter of a pipe 26 it is used to couple. For example, for a 3 inch schedule 40, 3 inch pipe, the inner diameter of the first pipe-mounting portion 16 is approximately 3½ inches. Similarly, the diameter of internal surfaces 28 and 30, that is the inner diameter of the second pipe-mounting portion 20 and the second coupling mating portion 22, is also the coupling inner diameter and is approximately the same as the external surface of a pipe 32 on which a second coupling piece 14 is mounted. Again, for a 3 inch pipe, the diameter of the surfaces 28 and 30 is approximately 3½ inches. In other words, the second coupling piece 14 has a single inner diameter, the coupling inner diameter, along its entire bore.

An external surface 34 of both the first pipe-mounting portion 16 and the first coupling mating portion 18 of the first coupling piece 12 has a fixed outer coupling diameter which is determined by the thickness of the first pipe-mounting portion 16. Thus, for a 3 inch pipe, with the first pipe-mounting portion being ¼ inch thick, the diameter of the external surface 34, or the coupling outer diameter, is approximately 4 inches. The second pipe-mounting portion 20 of the second coupling piece 14 has the same outer diameter. However, an inner diameter of the first coupling mating portion 18, that is, the diameter of internal surface 36, is an intermediate diameter which is between the coupling inner diameter and the coupling outer diameter. For a 3 inch pipe, with the first coupling mating portion 18 having a thickness of ⅛ inch, the intermediate diameter is approximately 3¾ inches. The outer diameter of the second coupling mating portion 22, that is, the diameter of external surface 38, is also approximately this intermediate diameter, which is 3¾ for a 3 inch pipe.

An annular, internally protruding shoulder 40 is positioned on the internal surface of the first coupling piece 12 between the first coupling mating portion 18 and the first pipe-mounting portion 16 so as to abut against the end of a pipe 26 on which the first coupling piece 12 is mounted and thereby prevent the first coupling piece 12 from sliding on the pipe 26 further than the length of the first pipe-mounting portion 16.

Figure 2:
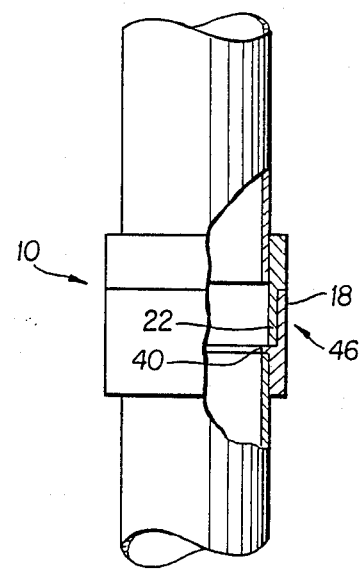
FIG. 2 is a side, partially cut-away, view of two pipes joined together by the two-piece slip-joint coupling of FIG. 1.
Figure 3:
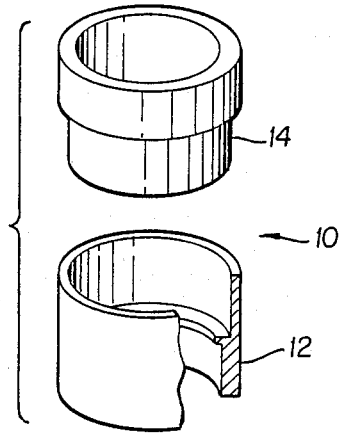
FIG. 3 is an isometric, exploded, partially cut-away, view of two separated pieces of the two-piece slip-joint coupling of FIGS. 1 and 2.

The length of the first coupling mating portion 18 is the same as the length of the second coupling mating portion 22, which, for coupling a 3 inch pipe is approximately 1½ inches long, thus, when the second coupling mating portion 22 of the second coupling piece 14 is telescoped into the first coupling mating portion 18 of the first coupling piece 12, as is depicted in FIG. 2, the composite of the first and second coupling pieces 12 and 14 thereby formed has the coupling inner diameter (3½ inches for 3 inch, schedule 40, pipe) and the coupling outer diameter (4 inches for 3 inch, schedule, pipe) along its entire length.

Describing now operation of the slip-joint coupling 10, the first pipe-mounting portion 16 of the first coupling piece 12 is mounted on an end 42 of the pipe 26, the pipe 26 sliding along the internal surface 24 thereof until the end of the pipe contacts the shoulder 40. The second coupling piece 14 is slipped onto an end 44 of the pipe 32 and is slid along this pipe until its lower end 43 is beyond the pipes end 44. In this position of the second coupling piece 14, the pipe 32 can be moved laterally into position above (as shown in FIG. 1) an end 45 of the first coupling piece 12. An adhesive is then smeared onto an end portion of the pipe 32, onto the external surface 38 of the second coupling mating portion 22, and onto the internal surface 36 of the first coupling mating portion 18. The second coupling mating portion 22 of the second coupling piece 14 is telescoped into the first coupling mating portion 18 of the first coupling piece 12 while the pipes 26 and 32 are held in fixed positions. Once the adhesive has cured, the joint will appear as is depicted in FIG. 2. The first and second coupling mating portions 18 and 22 being adhered together to form a composite wall which is approximately ¼ inch thick, the same thickness as the first and second pipe-mounting portions 16 and 20. Thus, the composite coupling 46 depicted in FIG. 2 has a uniform thickness throughout its length with the exception of the internal shoulder 40 at which the composite coupling 46 is slightly thicker. The adhesive holds these two members together in such a manner as to form a solid wall. And thereby bridge the pipe ends 40 and 44, which often remain separated as is depicted in FIG. 2.

Figure 4:
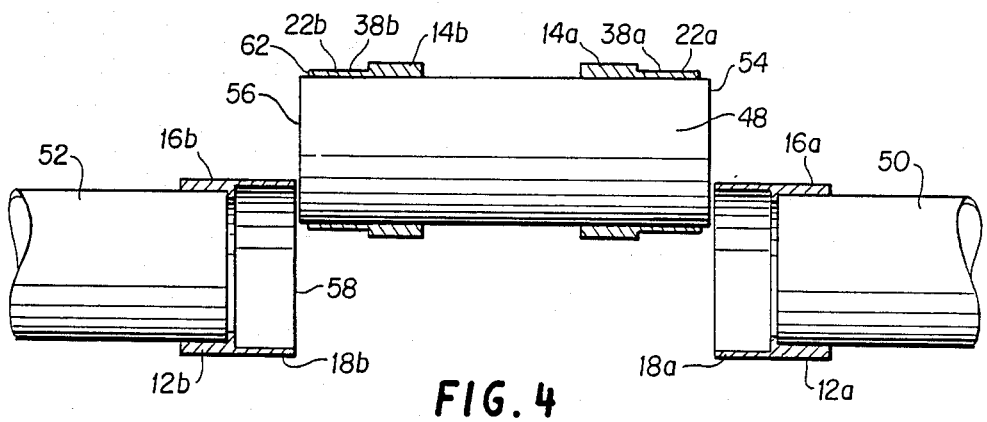
FIG. 4 is a side, partially sectional, view of a pipe section being joined to two fixed pipes with two two-piece slip-joint couplings of this invention.
Figure 5:
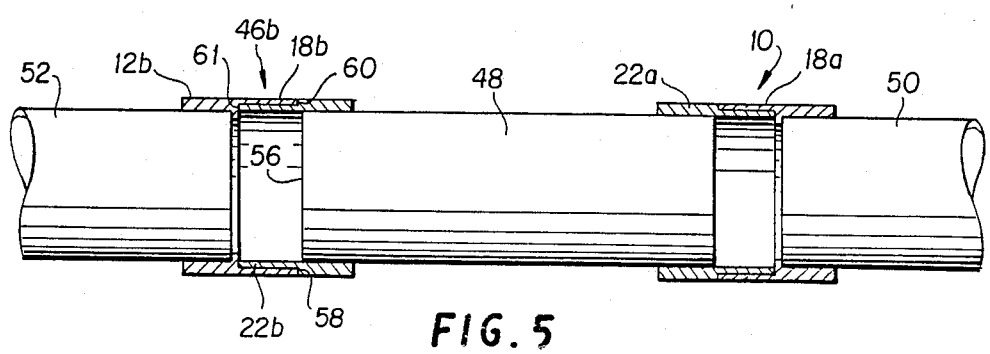
FIG. 5 is a side, partially sectional, view of the pipes, pipe section and couplings of FIG. 4 after the slip-joint coupling pieces have been telescoped together.

FIGS. 4 and 5 depict the manner in which a pipe section 48 is laterally moved between pipes 50 and 52 and joined thereto by slip-joint couplings 10 of this invention. In this respect, first coupling pieces 12a and b are mounted on respective ends of the fixed pipes 50 and 52 and adhered thereto with an adhesive, with the first pipe-mounting portions 16a and b being mounted on the pipes 50 and 52 and first coupling mating portions 18a and b being directed away from ends of the pipes 50 and 52 toward one another. The pipe section 48 is then cut so that it will fit between outer ends of the first coupling mating portions 18a and b and second coupling pieces 14a and b are then slid onto opposite ends of the pipe section 48 with second coupling mating portions 22a and b being directed outwardly. The pipe section 48, with its second coupling pieces 14a and b mounted thereon, is then positioned between the pipes 50 and 52, and adhesive is placed on the external surfaces 38a of the second coupling mating portion 22a and on an end portion of the pipe section 48 near an end 54. Thereafter, the pipe coupling piece 14a is slid to the right as show in FIG. 5 so that the second coupling mating portion 22a telescopes into the first coupling mating portion 18a while the pipe section 48 is held stationary. The position of the pipe section 48 can be easily ascertained by holding its opposite end 56 adjacent and outer end 58 of the first coupling piece 12b.

Once this adhesive has cured, adhesive is placed on an external surface 38b of the second coupling mating portion 22 and the external surface of the pipe section 48 near its end 56 and the second coupling piece 14b is slid to the left as shown in FIG. 4 to telescope into the first pipe-mounting portion 16 to from a composite coupling joint 46b shown in FIG. 5.

It should be appreciated that adhesive will automatically be scraped into abutments 60 and 61 between the first and second coupling mating portion 18b and 22b and shoulders formed on ends of the first and second pipe mounting portions 16 and 20.

It can be appreciated by those of ordinary skill in the art that the slip-joint coupling of this invention is relatively inexpensive to construct, but yet provides vast improvements over slip-joint coupling joints shown in the prior art. In this respect one can easily ascertain the position of the members of the slip-joint coupling relative to ends of pipes being joined therewith. Thus, it is easy to center the slip-joint coupling on a joint. Further, this slip-joint coupling forms a composite joint having one uniform, coupling outer diameter which is unusually small throughout. There are no external protrusion but yet the walls of the joint are of a thickness which is fully acceptable and within codes. A joint formed by the slip-joint coupling is strong and reliable. But even more importantly, such a joint does not take up an undue amount lateral space and can be installed in a thinner wall than can most prior art slip coupling joints.

While the invention has been particularly shown and described with reference to a preferred embodiment, it will be understood by those skilled in the art that various changes in form and detail may be made therein without departing from the spirit and scope of the invention. For example, it would be possible to have an internal shoulder on the second coupling piece 14 and allow the first coupling piece 12 to freely slide on a pipe rather than the other way around as is described herein. Also, in all of the examples given above it is assumed that schedule 40 pipe (pipe for drainage, waste and vents) is used such pipe has a thickness of ¼ inch for 3 inch pipe. However, schedule 80 pipe, which is thicker, and schedule 160, which is thinner, could also be used with this invention with approprate adjustment of the various dimensions involved.

The embodiments of the invention in which an exclusive property or privilege are claimed are defined as follows:

1. A two-piece slip-joint coupling for a pipe comprising:
   a cylindrically-shaped first coupling piece having a first pipe-mounting portion at one end and a first coupling mating portion at the other end, said first pipe-mounting portion having a coupling inner diameter of a size for snugly fitting an outer surface of a first standard plumbing pipe as an inner diameter and a coupling outer surface diameter which is substantially greater than said coupling inner diameter as an outer diameter;
   a separate cylindrically shaped second coupling piece having a second pipe-mounting portion at one end and a second coupling mating portion at the other end, said second pipe-mounting portion having said coupling inner diameter as an inner diameter for snugly fitting an outer surface of a second standard plumbing pipe of the same size as said first pipe and said coupling outer diameter as an outer diameter;
   one of said first and second coupling mating portions having said coupling inner diameter as an inner diameter and an intermediate diameter as an outer diameter, said intermediate diameter having a size between said coupling inner and outer diameters, the other of said first and second coupling mating portions having approximately said intermediate diameter as an inner diameter and approximately said coupling outer diameter as an outer diameter;
   said first coupling piece having an internally protruding shoulder between said first coupling mating portion and said first pipe-mounting portion to contact a coupling end edge of said first pipe on which said first coupling piece is mounted and thereby prevent said first coupling piece from sliding onto said first pipe beyond said internally-protruding shoulder, said second coupling piece not having an internally protruding shoulder for contacting a coupling end edge of said second pipe whereby said second coupling piece can slide onto the second pipe beyond its end;
   whereby said first pipe-mounting portion of said first coupling piece can be mounted on an end portion of said first pipe with said first coupling mating portion directed in the same direction as said coupling end edge of said first pipe and said shoulder abutting on said end edge of said first pipe, said second pipe-mounting portion of said second coupling can be mounted on an end portion of said second pipe with said second coupling mating portion directed in the same direction as said coupling end edge of said second pipe, and said second coupling piece can be slid onto said second pipe beyond the end edge thereof, and then slid toward the first pipe so that said coupling mating portion with said intermediate outer diameter telescopes into said coupling mating portion with said intermediate inner diameter so as to form a composite coupling joint for coupling said first and second pipes together having an outer diameter which is essentially uniform along the entire length of the composite coupling, and means for attaching said first coupling to said first pipe, said second coupling to said second pipe and said first coupling to said second coupling.

2. A slip-joint coupling as in claim 1 wherein said first coupling piece has said intermediate inner diameter.

3. A slip-joint coupling as in claim 2 wherein said second coupling piece has a fixed, inner diameter that extends the entire length of said second coupling piece.

4. A slip-joint coupling as in claim 3 wherein said first and second coupling mating portions are approximately equal in length so that when they are telescoped one into the other the composite slip-joint coupling thereby formed has a substantially uniform thickness throughout its length with the exception of said internal shoulder.

5. A slip-joint coupling as in claim 2 wherein said first and second coupling mating portions are approximately equal in length so that when they are telescoped one into the other the composite slip-joint coupling thereby formed has a substantially uniform thickness throughout its length with the exception of said internal shoulder.

6. A slip-joint coupling as in claim 1 wherein said first and second coupling mating portions are approximately equal in length so that when they are telescoped one into the other the composite slip-joint coupling thereby formed has a substantially uniform thickness throughout its length with the exception of said internal shoulder.

* * * * *